Aug. 9, 1932.  G. BURTON  1,870,555
BAND SAW GUIDE
Filed Feb. 9, 1931  2 Sheets-Sheet 2

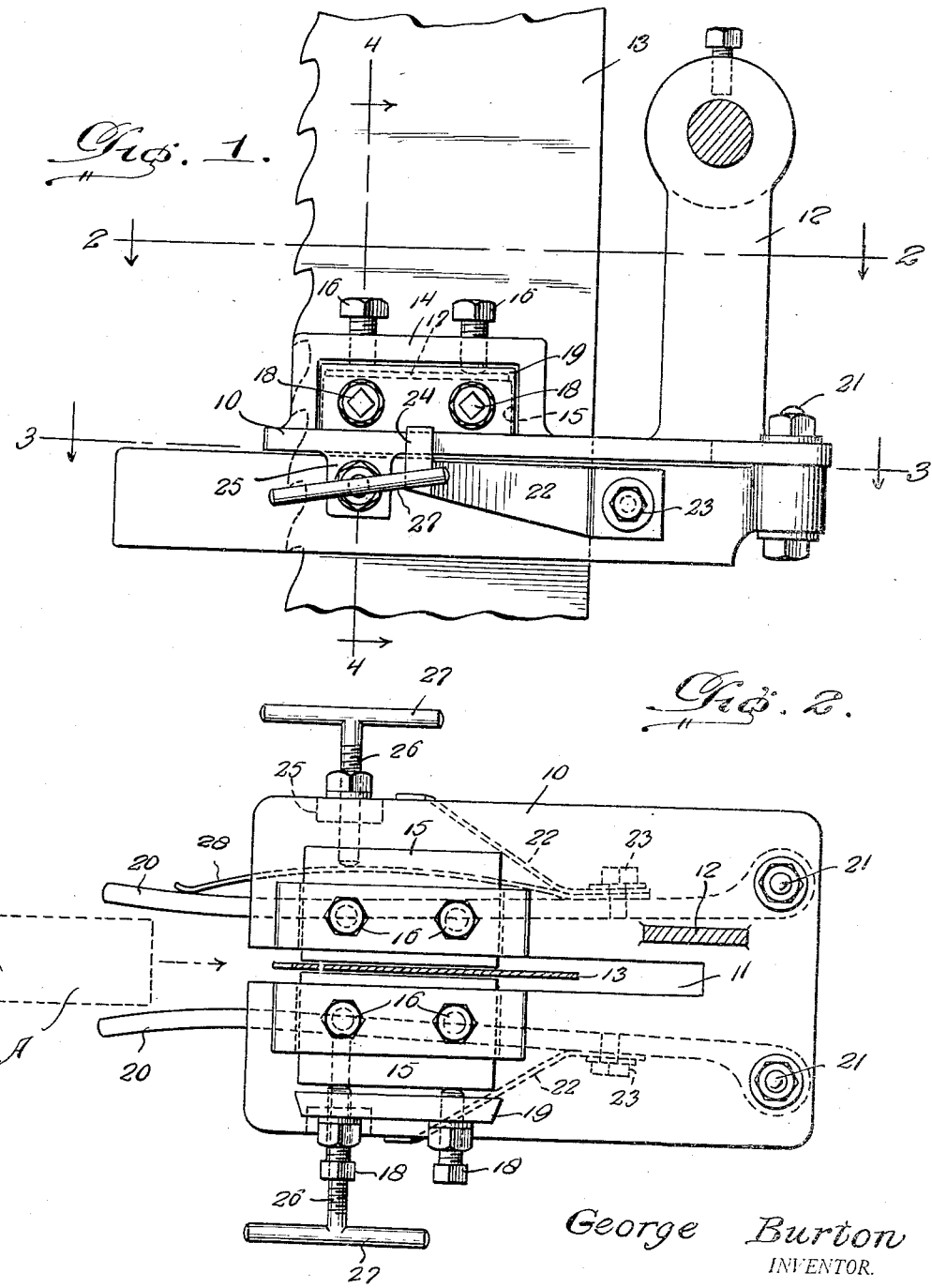

George Burton
INVENTOR.

BY J. Stanley Burch
ATTORNEY.

Patented Aug. 9, 1932

1,870,555

UNITED STATES PATENT OFFICE

GEORGE BURTON, OF KLAMATH FALLS, OREGON

BAND SAW GUIDE

Application filed February 9, 1931. Serial No. 514,610.

The present invention relates generally to band resaw machines, and more particularly to a saw guide therefor, whereby the work can be uniformly cut parallel to one side thereof, irrespective of the warping or irregular contour of the lumber or work.

In resawing lumber with band saws, it has been found to be especially difficult to make the cut the same distance from one side of the work, due to warping or to the irregular contour of the boards or strips.

My invention overcomes these difficulties by the provision of a laterally yieldable saw guide designed to engage and be moved by the work, whereby the saw is always maintained in proper relation to the work, to insure cutting parallel with one side of the lumber or work throughout the length of the latter.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the saw guide, illustrating a portion of the saw blade.

Figure 2 is a sectional view on line 2—2 of Figure 1.

Figure 4:
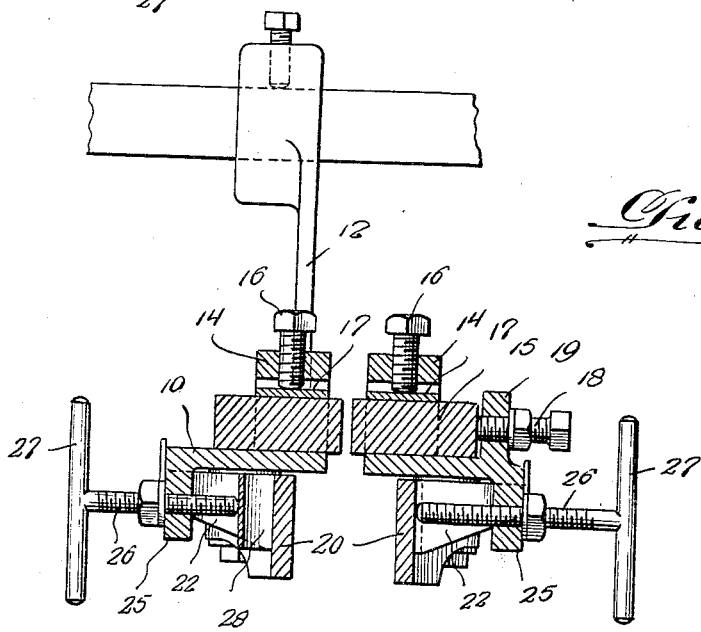
Figure 4 is a sectional view on line 4—4 of Figure 1.

The device forming the subject matter of the present invention, essentially embodies a base 10, preferably of elongated contour as clearly illustrated in Figure 2, and longitudinally slotted for a portion of its length as at 11. This base is suspended from a suitable hanger by a laterally flexible torsional spring or spring arm 12, adjacent the saw blade 13, the latter passing through the slot 11 of the base as shown. Arranged upon the base 10 and located at opposite sides of the slot 11 thereof, are substantially inverted U-shaped keepers 14, each of which accommodates an adjustable saw engaging member 15. These members 15 are in the nature of blocks constructed from any suitable material, and which can be adjusted toward and away from each other to effectively guide the saw 13. Each block 15 is held fixed relative to the base 10 by a suitable fastening element 16. These elements are preferably in the nature of set screws which have their free ends bearing against wear plates 17 reposing upon the blocks 15. In order that a nicety of adjustment can be provided for between the blocks 15, one of these blocks is susceptible of being adjusted through the instrumentality of adjusting screws 18, which are supported by a flange 19 rising from one longitudinal edge of the base 10 as clearly illustrated in Figure 4.

Figure 3:
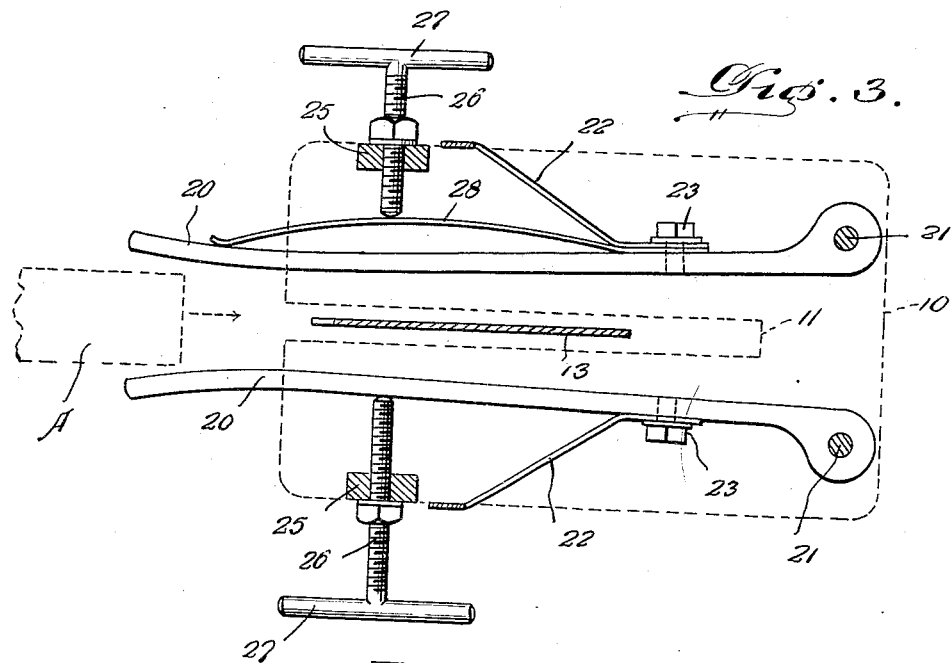
Figure 3 is a sectional view on line 3—3 of Figure 1.

Arranged beneath the base 10 and supported thereby is a pair of substantially parallel work engaging plates 20, located at opposite sides of the slot 11. These plates 20 are preferably mounted at corresponding ends on suitable pivots 21, whereby they can be moved toward and away from each other. The free ends of the plates 20 are slightly flared outwardly as clearly shown in Figure 3, so that the work indicated at —A— can readily enter or pass between said plates.

A leaf spring of angular contour is terminally connected with each plate 20 and the adjacent edge of the base 10, for the purpose of spreading the plates 20, incident to their release from the means employed for adjusting said plates toward each other into operative relation. Each of these springs is indicated at 22, and each includes an angularly disposed body portion located beneath the base 10, one end of each spring lying flat against its particular guide plate 20 and secured thereto by a suitable fastening element indicated at 23. The opposite end of each spring terminates to provide a right angularly disposed extension 24 which engages the adjacent longitudinal edge of the base 10 as clearly illustrated in Figure 1.

Depending from the opposed longitudinal edges of the base 10 are spaced alined apertured lugs 25 through each of which is threaded an adjusting screw 26, preferably characterized by a cross handle 27. Interposed between one of these adjusting screws 26 and the adjacent plate 20, is a bowed leaf spring 28, one end of which is secured to the adjacent plate 20 by the same fastening element 23 that connects the spring 22 thereto, the free end of the spring 28 engaging the adjacent plate 20 near its free end. The purpose of the spring 28 will be presently described. The adjusting screws 26 are obviously employed to move the plates 20 toward each other, with a view of properly positioning the plates relatively for the particular work to be engaged thereby. If the adjusting screws 26 are turned in a direction to relieve the plates 20 of pressure, the springs 22 function to automatically spread or separate the plates 20 as will be readily understood.

In machines of the character described, it is frequently difficult to uniformly cut the material or work —A— the same distance from one side thereof, sometimes due to the shifting of the saw blade 13, or the lateral movement of the work —A— as it approaches the blade, and as hereinabove stated the purpose of this invention is to overcome these difficulties, and to insure a proper cut through the material, irrespective of the warping or irregularity in the shape or configuration of the article to be cut.

In practice, the work —A— is fed to the saw 13, between the plates 20 in any ordinary well known manner, prior to which, however, the saw engaging blocks 15 are adjusted to engage the saw blade. As the work —A— approaches the saw, the latter is always held and maintained in proper relation to the work.

The torsional spring 12 allows the saw guide to yield laterally as a unit, thereby accommodating itself to warped, winding or twisted lumber. Inasmuch as the work is always engaged by the plates 20, the saw is constantly maintained in proper relation to the work so that the latter is cut parallel to the side of the work engaged by the relatively stationary plate 20. By having one of the plates 20 supported for yielding movement with relation to the other plate 20, it is manifest that the yieldably supported guide plate exerts a pressure against the work irrespective of any irregularities in the shape or configuration of the work itself. Obviously, the construction and arrangement of the spring 28 provides for this relatively yielding movement of one plate 20 with relation to the other. By virtue of this construction the saw guide and saw as a unit is controlled to cut parallel to one side of the work irrespective of the contour of the latter, which would be compensated for by the spring 28.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim as new is:

1. A unitary saw guide for a band resaw machine, comprising a base, opposite saw-engaging elements carried by the base, opposite lumber-engaging elements carried by the base, and a torsional plate whose axis is parallel to but spaced from that of the saw to yieldingly mount the base for lateral movement whereby said guide accommodates itself to the lumber irrespective of the shape of the latter.

2. A saw guide for a band resaw machine, comprising a base, opposite saw-engaging members mounted upon the base, opposite lumber-engaging elements mounted on the under side of the base to receive the strip of lumber therebetween, means for mounting the base on the resaw machine for lateral yielding movement whereby said guide accommodates itself to warped lumber, said lumber-engaging elements being adjustable toward and away from each other, means for adjusting said lumber-engaging elements, said adjusting means comprising springs constantly acting to spread the lumber-engaging elements apart, and means for manually adjusting the lumber-engaging elements toward each other against the action of said springs to insure cutting of the lumber parallel to one side thereof.

In testimony whereof I affix my signature.

GEORGE BURTON.